No. 860,879. PATENTED JULY 23, 1907.
A. McKENZIE.
PIPE MACHINE.
APPLICATION FILED MAR. 1, 1907.

5 SHEETS—SHEET 2.

Witnesses.
Harry O. Rastetter.
Sylvia Boson.

Inventor
Angus McKenzie
By
Attorney

No. 860,879. PATENTED JULY 23, 1907.
A. McKENZIE.
PIPE MACHINE.
APPLICATION FILED MAR. 1, 1907.
5 SHEETS—SHEET 3.
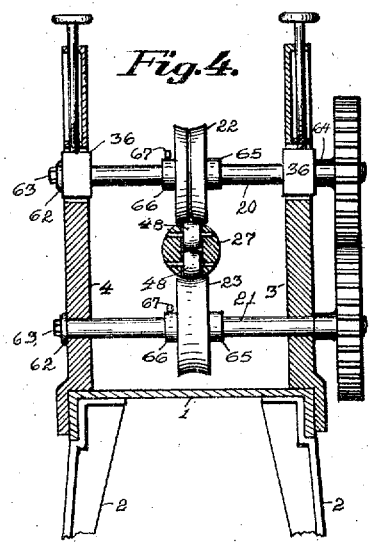
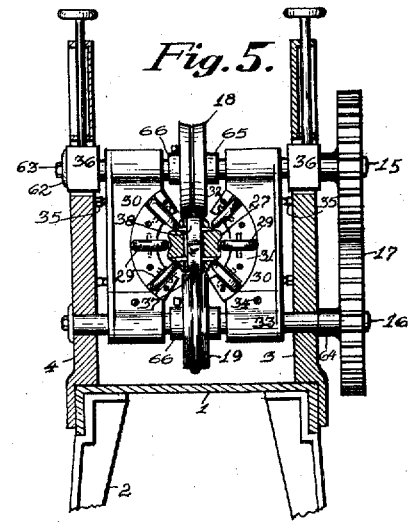
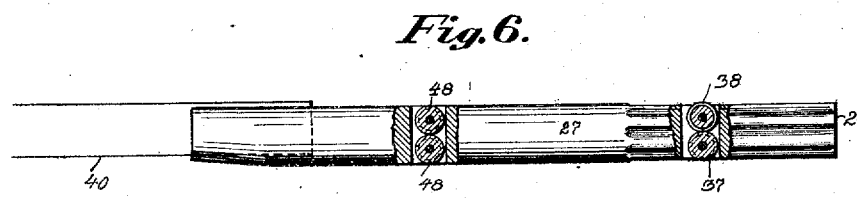
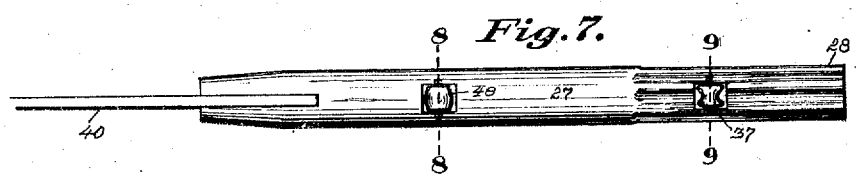
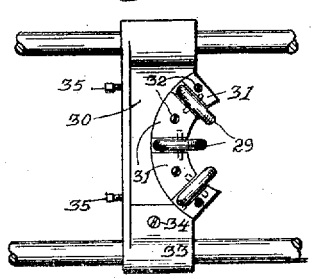
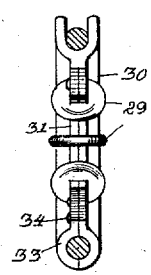
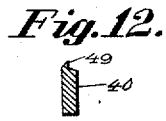
Witnesses
Harry O. Rastetter.
Sylvia Boron.
Inventor.
Angus McKenzie
H. W. Byrd
Attorney.

No. 860,879. PATENTED JULY 23, 1907.
A. McKENZIE.
PIPE MACHINE.
APPLICATION FILED MAR. 1, 1907.
5 SHEETS—SHEET 4.

*Fig. 16.* *Fig. 17.* 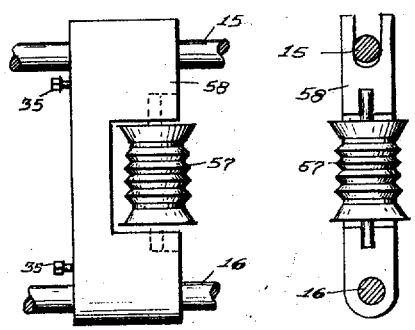
Witnesses
Harry O. Rastetter
Sylvia Boron
Inventor:
Angus McKenzie
H. W. Bond
By
Attorney.

No. 860,879. PATENTED JULY 23, 1907.
A. McKENZIE.
PIPE MACHINE.
APPLICATION FILED MAR. 1, 1907.
5 SHEETS—SHEET 5.

Witnesses
Harry O. Rastetter
Sylvia Boron

Inventor
Angus McKenzie
By H. W. Bond
Attorney

UNITED STATES PATENT OFFICE.

ANGUS McKENZIE, OF CANTON, OHIO.

PIPE-MACHINE.

No. 860,879.

Specification of Letters Patent.

Patented July 23, 1907.

Application filed March 1, 1907. Serial No. 360,101.

*To all whom it may concern:*

Be it known that I, ANGUS MCKENZIE, a subject of the King of Great Britain, residing at Canton, in the county of Stark and State of Ohio, have invented certain new and useful Improvements in Pipe-Machines; and I do hereby declare that the following is a full, clear, and exact description of the same, reference being had to the annexed drawings, making a part of this specification, and to the numerals and figures of reference marked thereon, in which—

Figure 1:
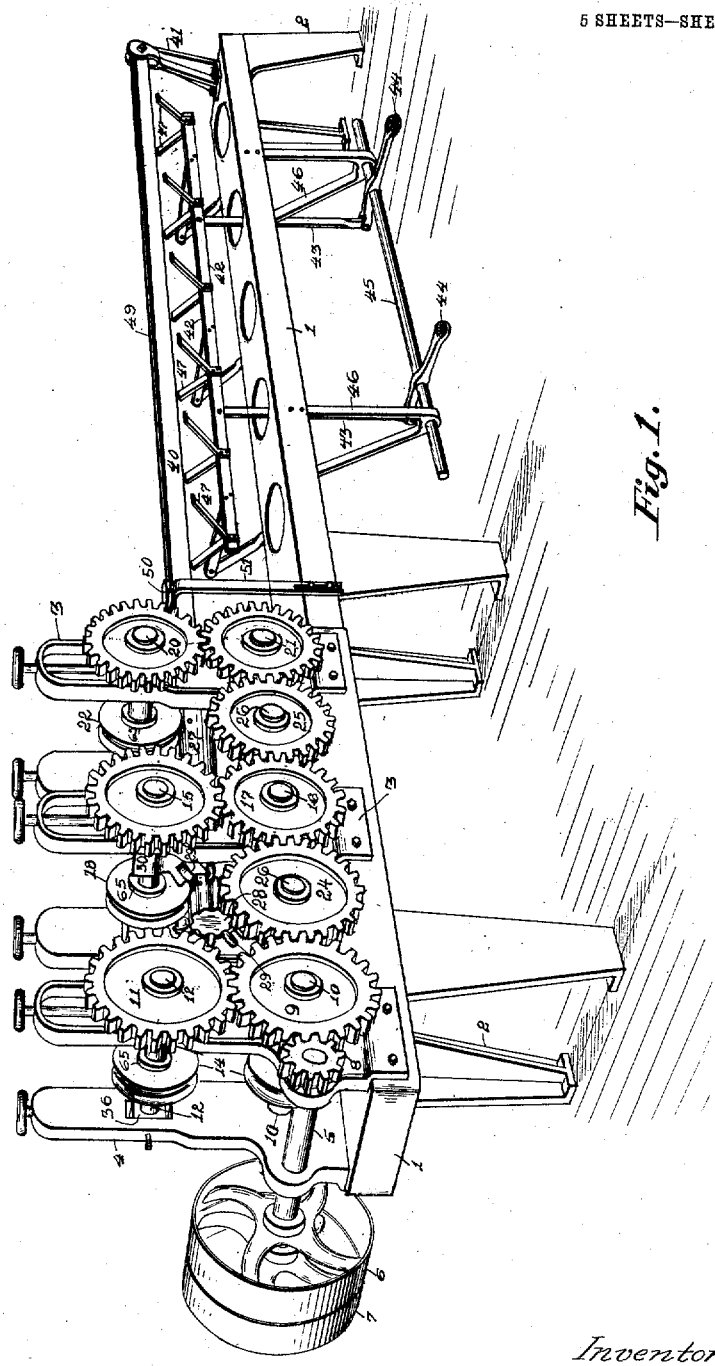
Figure 2:
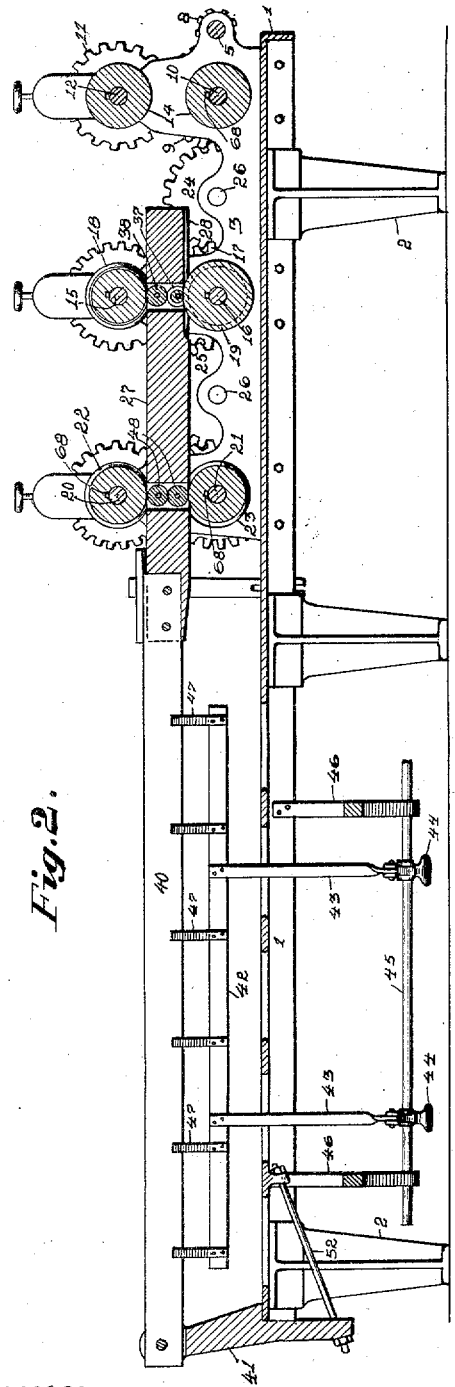
Figure 3:
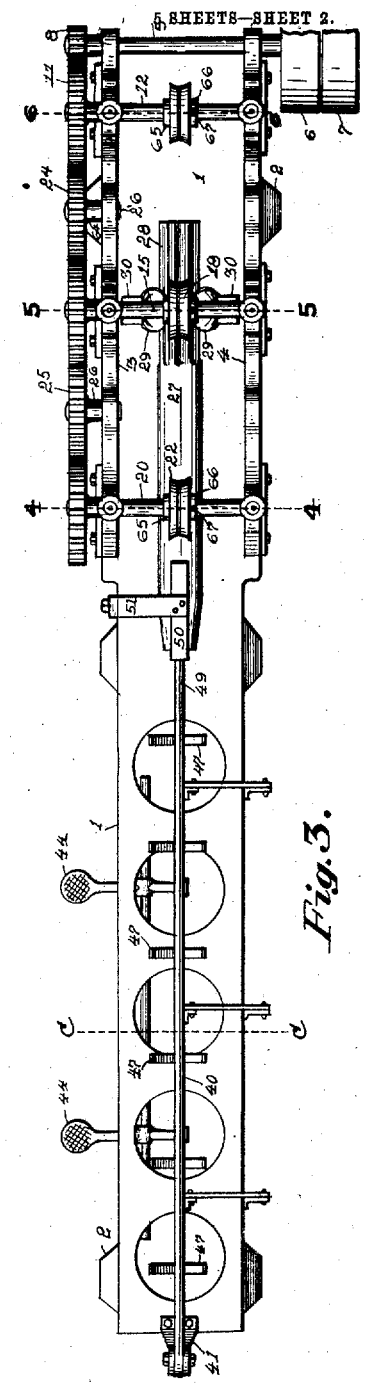
Figure 13:
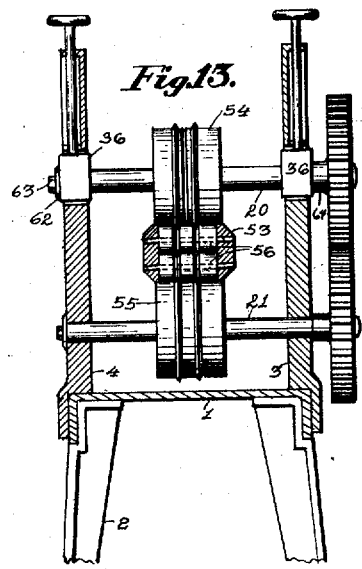
Figure 14:
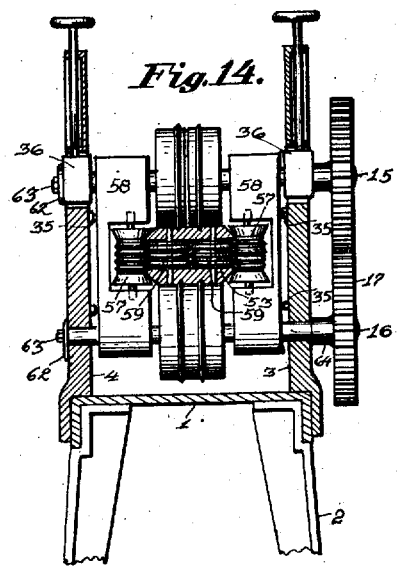
Figure 15:
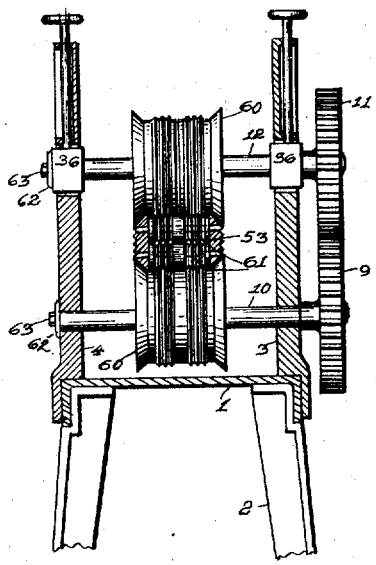
Figure 18:
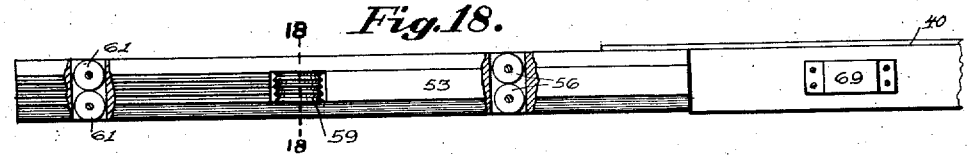
Figure 19:
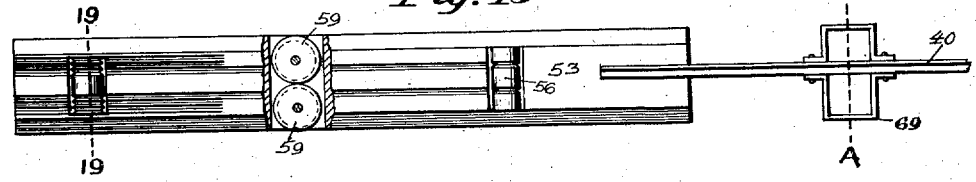
Figure 20:
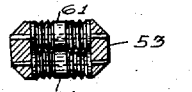
Figure 21:
Figure 22:
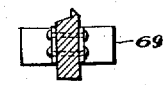
Figure 23:
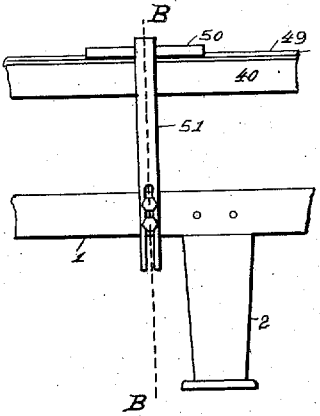
Figure 24:
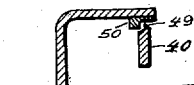
Figure 25:
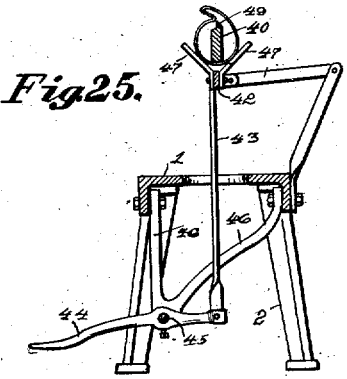
Figure 26:
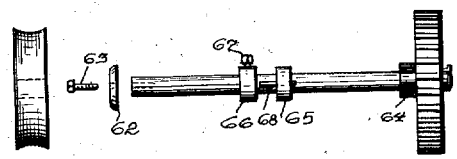

Figure 1 is a perspective view showing the different parts of the machine properly assembled. Fig. 2 is a vertical section of the machine. Fig. 3 is a top view. Fig. 4 is a section on line 4—4, Fig. 3. Fig. 5 is a section on line 5—5, Fig. 3. Fig. 6 is a detached side view of the mandrel and skelp holding bar showing parts in section. Fig. 7 is a detached bottom view of the mandrel and holding bar. Fig. 8 is a section on line 8—8, Fig. 7. Fig. 9 is a section on line 9—9, Fig. 7. Fig. 10 is a side view of one of the corrugating heads. Fig. 11 is an edge view of one of the corrugating heads. Fig. 12 is a transverse section of the skelp holding and guide bar. Fig. 13 is a transverse section of the machine proper on line 4—4, Fig. 3, except that the parts shown in this figure are for the manufacture of square pipe instead of round. Fig. 14 is a section taken on line 5—5, Fig. 3, except the parts shown in this figure are for the manufacture of square pipe instead of round. Fig. 15 is a vertical section taken on line 6—6 Fig. 3, except the parts shown are for the production of square pipe. Fig. 16 is a side view of one of the corrugating heads designed for the production of square pipe. Fig. 17 is an edge view of the head shown in Fig. 16. Fig. 18 is a side view of the mandrel for the manufacture of square pipe. Fig. 19 is a top view of the mandrel for the manufacture of square pipe. Fig. 20 is a transverse section on line 19, Fig. 19. Fig. 21 is a section on line 18, Fig. 18. Fig. 22 is a section on line A—A, Fig. 19. Fig. 23 is a view showing a portion of the pipe holding and guiding bar, a portion of the frame, also showing the pipe retaining bar. Fig. 24 is a section on line B—B, Fig. 23. Fig. 25 is a transverse section on line C—C, Fig. 3, except a pipe is shown upon the pipe holding bar, which is not shown in Fig. 3. Fig. 26 is a detached view of one of the shafts designed to carry a roll, also showing the gear wheel connected thereto. The shaft shown in this figure may be of any of the various shafts, which are located above and below the mandrel.

The present invention has relation to pipe machines, and it consists in the different parts and combination of parts hereinafter described and particularly pointed out in the claims.

Similar numerals of reference indicate corresponding parts in all the figures of the drawings.

In the accompanying drawings, 1 represents the base of the machine, which is formed of a length to correspond substantially with the length of the machine proper. The frame 1 should be of rigid construction and of sufficient strength to support the various parts of the machine, which parts are connected and arranged substantially as hereinafter described. The base which is to be supported in proper elevation by means of the legs 2. To the base 1 are securely attached the housings 3 and 4, which housings are for the purpose of providing a means for carrying the various shafts hereinafter described, which shafts are located or journaled in suitable bearings. In the rear pair of housings 3 and 4 is journaled the power shaft 5, which power shaft is provided with the usual tight and loose pulleys 6 and 7.

It will be understood that it is not absolutely necessary to journal the shaft in the housings as above described, but it may be journaled in a separate structure, and the same object and purpose carried out.

The power shaft 5 is provided with the driving pinion 8, which driving pinion meshes with the gear wheel 9, which gear wheel is securely mounted upon the shaft 10. The gear wheel 9 meshes with the gear wheel 11, which gear wheel is mounted upon the shaft 12, and upon the shafts 10 and 12 are located the delivery rolls 14. Directly in front of the shafts 10 and 12 are located the shafts 15 and 16 and upon the shaft 16 is securely mounted the gear wheel 17. Upon the shaft 15 is mounted the grip wheel or roll 18, and upon the shaft 16 is mounted the combined grip and corrugating wheel or roll 19, which rolls are located directly one above the other. Directly in front of the shafts 15 and 16 are located the shafts 20, and 21, and upon the shaft 20 is mounted the seaming roll 22, and upon the shaft 21 is mounted the grip roll 23, said rolls being located one above the other as illustrated in Fig. 4.

It will be understood that the upper series of shafts should rotate in the same direction and the lower series of shafts should rotate in the same direction, but the upper series of shafts must rotate in the opposite direction from that of the lower series and in order to provide for this movement the idlers 24 and 25 are interposed between the lower set or system of gear wheels, which idlers are loosely mounted upon short studs 26 or their equivalents. Between the upper series of rolls and the lower series of rolls above described is located the mandrel 27, which mandrel is supported by the lower series of rolls. The mandrel 27 is provided with the integral corrugated portion 28, which integral corrugated portion is for the purpose of assisting in forming the corrugations in the pipe in conjunction with the combined grip and corrugating roll 19, and the radial corrugating rolls 29, which corrugating rolls 29 are properly journaled in the adjustable plates 30 which adjustable plates are held by means of the shafts 15 and 16. For the purpose of holding the corrugating rolls 29 in proper position the detachable plates 31 are provided, which detachable plates are connected to the plates 30 by means of suitable screws 32 or their equivalents.

For the purpose of holding the plates 30 in proper relative position with the shafts 15 and 16, the top or upper portion of the plates 30 are bifurcated, which bifurcated portions receive the upper shaft 15. The lower end of the plates are held in proper position by means of the clip 33, which clip or connected by means of the screws 34 or their equivalents. To compensate for different thicknesses of metal employed in the manufacture of conductor pipe, and also to provide for the formation of deep and shallow corrugations the plates 30 together with the different parts carried thereby are adjustably mounted upon the shafts 15 and 16 and are held in fixed adjustment against outward movement by the set screws 35, which set screws are adjustable with reference to the plates 30, and by changing the adjustment of the set screws 35, the plates 30 together with the parts carried thereby are set to or from the mandrel 27, by which arrangement I am enabled to provide for different thicknesses of metal. For the purpose of providing adjustment between the peripheries of the rolls 18 and 19 the upper shaft 15 upon which the roll 18 is mounted is located in the adjustable bearings 36.

For the purpose of reducing the friction as between the pipe and the mandrel during the time it is being corrugated the anti-friction rolls 37 and 38 are provided, which rolls are properly journaled in the mandrel. This feature being best illustrated in Fig. 5. For the purpose of forming the corrugation in the pipe in line, or in the path of the anti-friction roll 37 and the combined corrugating and grip roll 19, the peripheries of the anti-friction roll 37 is grooved and the combined grip and corrugating roll 19 is provided with a ridge which fits in or comes in alinement with the groove formed in the periphery of the roll 37. To the mandrel 27 is attached the bar 40, which bar is formed of sufficient length to receive thereon the skelp from which the pipe is to be made. The bar 40 is connected to the upright 41, which upright is secured by bolts or otherwise to the bed plate 1. Directly below the bar 40 is located a movable bar 42, which movable bar is supported by means of the vertical bars 43, which vertical bars extend downward through the bed-plate 1 and their bottom or lower ends connected to the foot levers 44, which foot levers are mounted upon the rod 45 or its equivalent, and the rod held in fixed position by means of the brackets 46, which brackets are connected to the bed-plate 1 or its equivalent. To the bar 42 are attached the outwardly bent short bars 47, which bars constitute compressors for the skelp designed to be corrugated, and in use the skelp before the hooked edges thereof are connected together is placed upon the bar 42 and is permitted to hang upon said bar. While the skelp is in this position the foot levers 44 are pressed downward at their outer ends or one of the foot levers pressed downward, as the case may be, which elevates the inner ends of the foot levers and move the bar 43 upward, and by reason of the angled bars 47 located above the bar 42 the pipe or skelp when brought in contact with the bottom or under edge of the bar 40, will have a tendency to compress the pipe and bring the hooked edges in proper position to be hooked together. It will be understood that any desired number of outwardly bent bars 47 may be employed.

After the hooked edges of the skelp have been properly connected together the bar 42 is lowered so as to permit the skelp to hang upon the bar 40, and the pipe is then moved endwise until it is gripped between the seaming roll 22 and the roll 23 and the anti-friction rolls 48, and by the rotary movement of the seaming roll 22 and the roll 23 the pipe is then moved over and upon the mandrel and as the pipe advances it will be gripped between the rolls 18 and 19 and the anti-friction rolls 37 and 38 and at this point the mandrel is corrugated and the corrugations pressed into the pipe as it passes the corrugating rolls 29, thus completing the corrugations of the skelp.

It will be understood that the pipe must move in a true line and for the purpose of preventing any twisting or turning of the pipe the bar 42 is provided with the flange 49 upon which flange the outer edge or face of the lower hooked edge of the pipe abuts.

For the purpose of holding the hooked edges of the pipe in proper engagement with each other, and at the same time guiding the pipe in a true line the bar 50 is provided, which bar is connected to the adjustable support 51, which adjustable support is connected to the bed-plate 1 or its equivalent.

It will be understood that the flanges 49 and the flange bar 50 are so arranged that they will hold the hooked edges of the skelp together and at the same time guide the skelp in such a manner, that when the skelp reaches the seaming roll 22 the hooked edges will be compressed and the seam formed.

For the purpose of delivering the pipe after it has been finished the delivery rolls 14 are provided. It will be understood that during the time the skelp is being seamed and corrugated there will be more or less pull upon the mandrel and also upon the bar 40, which is connected to the mandrel and in order to compensate for this strain and prevent any springing of the upright 41 the brace rod 52 is provided, which brace rod is connected to the lower end of the upright 41, and to some fixed part of the bed-plate 1.

For the purpose of manufacturing conductor pipe which is square in cross-section the round mandrel 27 is removed and the square mandrel 53 substituted and at the point where the seaming is done, the seaming roll 54 is substituted for the seaming roll 22, which seaming roll is a combined seaming and corrugating roll. Below the mandrel 53 is located the corrugating roll 55, which is substituted for the roll 23 and the anti-friction rolls 56 provided. At the point where the pipe is corrugated upon its sides the corrugating rolls 57 are provided and are journaled in the plates 58, which are supported by the shafts 15 and 16. At the point where the corrugating rolls 57 are located the mandrel is provided with the combined anti-friction and corrugating rolls 59, which are located in the mandrel substantially as shown in Fig. 14. When square pipe is produced the square mandrel is extended or formed somewhat longer than the round one, and the second set of corrugating rolls 60 substituted for the delivery rolls 14, and the combined anti-friction and corrugating rolls 61 provided.

For the purpose of holding the various shafts upon which the grip, seaming, corrugating and delivery rolls are located said shafts are provided with the detachable collar or flange 62 but are held against the outer faces of the housings and bearings as the case may be, by means of the lug bolts 63 or their equivalents and the hubs 64 or their equivalents.

It will be understood that it is necessary to change from time to time the various rolls reference being had to the class of work they are to perform, and in order to change the rolls the various shafts upon which they are mounted must be removed or partially removed and moved endwise and at this time the collar or flange 63 is removed so that the shafts can be moved endwise.

For the purpose of holding the various rolls in proper position the collars 65 and 66 are provided, and the collar 65 held in fixed position in any convenient and well known manner and the collar 66 held by the set screw 67 or its equivalent.

For the purpose of causing the various rolls to rotate with the shafts the keys or feathers 68 are provided, which are seated in suitable grooves formed in the shaft apertures of the various rolls, this feature being best illustrated in Figs. 2 and 26.

When it is desired to manufacture square and angular pipe the bar 40 should be provided with the pipe holding brackets 69, which are illustrated in Figs. 18 and 19.

Having fully described my invention, what I claim as new and desire to secure by Letters Patent, is—

1. In a pipe machine, the combination of a frame, housings secured to the frame, two series of shafts, said shafts provided with seaming, grip, corrugating and delivery rolls, means for rotating the two series of shafts, a mandrel, a pipe holding bar located in alinement with the mandrel and provided with a guide flange and a guide plate located adjacent the pipe holding bar, substantially as and for the purpose specified.

2. In a pipe machine of the class described, a frame, housings secured to the frame, shafts journaled in the housing a mandrel held in fixed position, said mandrel provided with anti-friction rolls, seaming rolls mounted upon one of the shafts of the series, grip rolls located above and below the mandrel and adapted to grip the pipe and means for rotating the shafts provided with the seaming and grip rolls, substantially as and for the purpose specified.

3. In a pipe machine the combination of a frame or bed-plate, housings secured thereto, shafts having mounted thereon corrugating and grip rolls, and combined grip and corrugating rolls, a mandrel located intermediate the grip and combined grip and corrugating rolls, anti-friction rolls journaled in the mandrel and located intermediate the grip and combined grip and corrugating rolls, one of said anti-friction rolls provided with a grooved periphery, heads held in fixed position and provided with radial corrugating rolls, said heads adjustable to and from the mandrel, and means for holding said head and radial corrugating rolls against movement away from the mandrel, substantially as and for the purpose specified.

4. In a pipe forming machine, the combination of a frame, or bed plate, two series of shafts, pipe and seaming rolls mounted upon some of the shafts of the series, a mandrel located intermediate the series of parallel shafts, said mandrel provided with a pipe holding bar, a movable bar provided with means adapted to hold and elevate a pipe and means for guiding the pipe upon the pipe holding bar, substantially as and for the purpose specified.

5. In a pipe forming machine, the combination of a frame or bed plate, two series of shafts located in parallel planes, grip and seaming rolls mounted upon some of the shafts of the series, a mandrel located intermediate the series of parallel shafts, said mandrel provided with a pipe holding bar, a movable bar provided with means adapted to hold and elevate a pipe, means for guiding the pipe upon the pipe holding bar and means for holding the pipe holding bar and mandrel against end movement, substantially as and for the purpose specified.

6. In a pipe forming machine, the combination of a frame or bed-plate, a series of housings, and a series of shafts said series of shafts constituting upper and lower sets, a mandrel and one set of the series of shafts provided with seaming and grip rolls, a combined pipe holding and guide bar and a guide plate adjustable to and from the guide bar, substantially as and for the purpose specified.

7. In a pipe forming machine, a bed-plate, housings secured to the bed-plate, shafts journaled in the housings, said shafts composed of upper and lower series, the upper series journaled in adjustable bearings, a mandrel located between the upper and lower series of shafts and one end of the mandrel supported by the rolls located thereunder, said rolls constituting grip rolls, and corrugating rolls, anti-friction rolls journaled in the mandrel and seaming and grip rolls located in operative relation with the anti-friction rolls, substantially as and for the purpose specified.

8. In a pipe machine, the combination of a bed-plate, housings secured to the bed-plate, two series of shafts geared to rotate in unison and the shafts of the different series in opposite directions, a seaming roll mounted upon one of the shafts of the series, combined grip and corrugating rolls mounted upon the shafts, corrugating heads carrying corrugating rolls, and adjustable to and from each other, means for holding the corrugating heads in fixed adjustment, a mandrel located in operative relation with the seaming, grip and corrugating rolls, a pipe holding and guide bar and an adjustable guide plate, and means for imparting rotary motion to the shafts and the parts carried thereby, substantially as and for the purpose specified.

9. In a pipe machine, the combination of a base or bed-plate, housings secured to the bed plate, a series of shafts located in different sets one set of the series provided with combined grip, corrugating and seaming rolls, a mandrel located in operative relation with the rolls, a pipe holding and guide bar secured to the mandrel and means for holding the guide bar, and mandrel against endwise movement, substantially as and for the purpose specified.

10. In a pipe machine, a base, a series of shafts, housings and bearings for said shafts seaming, grip and corrugating rolls mounted upon the shafts, a mandrel having fixed thereto a pipe holding and guide bar, a movable bar located below the pipe holding bar, pipe compressing arms carried by said movable bar and means for elevating the movable bar, substantially as and for the purpose specified.

11. In a pipe machine of the class described, a mandrel provided with anti-friction rolls, said rolls adapted to abut against the inner surface of the pipe, grip seaming and corrugating rolls adapted for pressure upon the pipe, means for guiding the pipe upon the mandrel, and means for holding the mandrel against movement, substantially as and for the purpose specified.

12. In a pipe machine of the class described, the combination of a mandrel, means for holding the mandrel against endwise movement, anti-friction rolls journaled in the mandrel intermediate its ends, means for corrugating a pipe and means for guiding a pipe upon the mandrel, substantially as and for the purpose specified.

13. In a pipe forming machine, a mandrel adapted to receive a skelp, said mandrel provided with rolls, said rolls adapted for engagement with the skelp and the rolls located in contact with each other and pipe feeding rolls adapted for contact upon the outer surface of the pipe, and a seaming roll, substantially as and for the purpose specified.

14. In a pipe forming machine, a mandrel held in fixed position, said mandrel provided with rolls, the peripheries of said rolls adapted for contact with the inner surface of the pipe, pipe-conveying rolls and seaming and corrugating rolls adapted for engagement with the pipe, delivery rolls, and means for imparting rotary movement to the pipe-conveying and seaming rolls, substantially as and for the purpose specified.

15. In a pipe forming machine, the combination of a mandrel, rolls journaled in the mandrel and located in sets and each roll of each set adapted for contact one with the other, pipe feeding rolls and corrugating rolls, and means for imparting rotary motion to the feeding and corrugating rolls, substantially as and for the purpose specified.

In testimony that I claim the above, I have hereunto subscribed my name in the presence of two witnesses.

ANGUS McKENZIE.

Witnesses:
J. A. JEFFERS,
F. W. BURD.